United States Patent [19]
Pollock

[11] 3,821,419
[45] June 28, 1974

[54] INTERMEDIATES IN BREWING
[75] Inventor: James Richard Allan Pollock, Reading, England
[73] Assignees: The Dixon Malt Company Limited; The Enzymic Malt Company Limited, both of London, England
[22] Filed: Dec. 18, 1972
[21] Appl. No.: 315,909

Related U.S. Application Data
[63] Continuation of Ser. No. 71,388, Sept. 11, 1970, abandoned.

[30] Foreign Application Priority Data
Sept. 17, 1969 Great Britain.................... 45834/69

[52] U.S. Cl. .................................................. 426/29
[51] Int. Cl. .............................................. C12c 7/00
[58] Field of Search ................... 99/50.5, 51, 52, 27

[56] References Cited
FOREIGN PATENTS OR APPLICATIONS
1,083,485  9/1965  Great Britain
1,076,883  8/1965  Great Britain Primary Examiner—A. Louis Monacell
Assistant Examiner—R. B. Penland
Attorney, Agent, or Firm—Larson, Taylor & Hinds

[57] ABSTRACT

A brewing process uses a special malt in the grist, and this enables a high proportion of adjunct to be used. The total amount of adjunct used, either in the grist or in the wort produced by meshing a grist, or both, is 30 percent or more.

6 Claims, No Drawings

INTERMEDIATES IN BREWING

This is a continuation, of application Ser. No. 71,388 filed Sept. 11, 1970 now abandoned.

This invention relates to brewer's grists and to the preparation of worts, being intermediates in the process of brewing of beer.

The wort should contain such substances as will allow healthy yeast growth during the later fermentation stage and will give desirable flavour, colour and head characteristics in the finished beer.

Until now the principal constituent of the grist (which is the total composition which is mashed to produce a wort) has been brewer's malt, that is to say, a grain which has been subjected to a controlled germination, with the effect of increasing its enzyme content and rendering it more friable, so that its starch may be readily accessible for conversion in mashing.

The mashing involves an interaction between the enzymes present and substances convertible into soluble substances, particularly insoluble carbohydrates which are thus converted into soluble substances, and particularly also nitrogen-containing substances, which we shall refer to as convertible nitrogen.

The malting process involves a certain amount of loss and particularly it involves expense, and attempts have been made to cheapen the grist by admixing with the malt one or more adjuncts. Such adjuncts include raw grain (usually ground up), gelatinized grain, undermodified malt, and sugar syrups (prepared from natural or refined sugars or by enzymatic degradation of starch or grain in vitro). Gelatinization is usually achieved by a restricted cooking process.

When the grist is mashed the enzymes present in the grist act on the adjunct and produce from it the appropriate sugars and soluble nitrogen-containing compounds. However the ratio (soluble nitrogen-containing compounds: soluble carbohydrates) produced from the adjunct is very low compared with that ratio obtained from malt and so a limit is reached when the wort produced as a result of the addition of the adjunct will be seriously depleted from the point of view of content of permanently soluble nitrogen-containing compounds (referred to as permanently soluble nitrogen or "P.S.N.").

Attempts have been made to allow the use of large quantities of adjunct without effect on the P.S.N. of the wort by adding exogenous enzyme into the mash (see for example U.K. Pat. No. 1,083,485). The product of this process, although of adequate soluble nitrogen content does not have the same balance as a wort produced by a normal mashing process (i.e. one using no adjunct in the grist, or only a little of it).

The present invention on the other hand provides for the preparation of a wort having essentially the balance of a wort prepared by a normal mashing process while permitting the use of high quantities of adjuncts. The process depends on the presence of a malt which we shall call a special malt which will be defined hereafter, preferably also in the presence of ordinary brewer's malt. The amount of adjunct that can be used, with satisfactory results, depends on the amount of special malt and on the inherent nitrogen content of the adjunct and, when it is present, of the brewer's malt. For example barleys grown in North America have a much higher nitrogen content than do most European barleys, (and hence malts made from these barleys are particularly rich in soluble and convertible nitrogen). So the amounts of adjuncts that may be used in the present invention may differ according to the nature of the total grist but will at all times be greater, to give a wort of a given satisfactory composition, than would have been the case if the special malt had not been present.

On the other hand, if we use this special malt with inadequate quantities of adjunct in the grist, or no adjunct, we obtain a wort which has a quantity of soluble nitrogen which is excessive for direct use of the wort in the fermentation stage. In these cases we re-balance the wort by artificially increasing the sugar-content of the mash or the wort by addition of substantially non-nitrogenous preparation of sugars for example, cane-sugar, glucose or a syrup made from starch or cereals by enzymic or acid digestion.

The present invention enables unexpectedly high amounts of adjunct to be used (even, in some circumstances, up to being the whole of the grist apart from the special malt) without however causing deterioration in the overall quality of the wort.

In one aspect it provides a method of making a brewer's wort having a ratio of soluble nitrogen containing compounds to soluble carbonhdrates suitable for making beer and in which adjunct is used in addition to brewer's malt, the improvement which includes increasing the amount of adjunct which is used to an amount of at least 50 percent by weight while retaining the suitable ratio of the wort, by employing in the grist, in addition to brewer's malt, from 2 to 20 percent by weight of a special malt, the special malt having essentially at least 50 percent of its total nitrogen in the form of permanently soluble nitrogen, and at least 16 percent of its total nitrogen in the form of $\alpha$ -amino nitrogen, the wort having a permanently soluble nitrogen content of from 0.43 to 0.67 grams per liter calculated in the basis of a specific gravity of 1.04 and having an $\alpha$ -amino nitrogen content of from 0.105 to 0.15 grams per liter calculated in the basis of a specific gravity of 1.04.

In another aspect it provides a brewer's grist for making wort having a ratio of soluble nitrogen containing compounds to soluble carbonhdrates suitable for making beer, said grist including brewer's malt and special malt, the special malt having essentially at least 50 percent of its total nitrogen in the form of permanently soluble nitrogen and at least 16 percent of its total nitrogen in the form of $\alpha$-amino nitrogen, the special malt being present in the grist in an amount of from 2 to 20 percent by weight, the balance of the malt in the grist being brewer's malt, adjunct being used in the preparation of the wort in an amount of at least 50 percent based on the total weight of malt and adjunct, the grist being capable, when mashed, of making wort having a permanently soluble nitrogen content of from 0.419 to 0.67 grams per liter calculated in the basis of a specific gravity of 1.04 and having an $\alpha$ -amino nitrogen content of from 0.105 to 0.15 grams per liter calculated in the basis of a specific gravity of 1.04.

In this latter aspect, special malt contents in the grists of between 2 and 10 percent by weight give particularly valuable results and the percentage of total solid adjunct is preferably more than 35 percent by weight, the balance being brewer's malt.

The "special malts" have a permanently soluble nitrogen content of at least 50 percent of the total nitrogen of the grain and an α-amino nitrogen content of at least 16 percent of the total nitrogen of the grain. They usually will have an acidity of at least 1.2 percent calculated as lactic acid. Such special malts may be prepared, for example, by anaerobic storage processes as claimed in our U.K. Pat. No. 1,076,883 with a long anaerobic phase or, for example, by use in an "ordinary" malting process of unusually high amounts of gibberellic acid and carrying out late germination. They may be used, within the present invention, in the form of extracts or concentrates as well as in their green or kilned states.

We have found that the increase in the total of the soluble nitrogenous substances present in these worts is the result in part of an unexpected interaction between the enzymes of the malt and the proteins of the brewer's malt and the adjunct (e.g. unmalted cereal of undermodified malt) which is induced by substances contained in the added special malt. Furthermore, the additional nitrogenous substances have been found to include α-amino acids useful in promoting the growth of yeast, as well as more complex nitrogenous compounds having relevance to other aspects of wort quality.

Where no adjunct is present in the grist, the effect of the presence of the special malt is exerted on the interaction between the proteins and enzymes of the normal malt, and the resulting worts then contain excessive quantities of soluble nitrogenous substances. As has been explained, in this case these nitrogenous substances should be "diluted" to re-balance the wort, by adding to the wort a non-nitrogenous or only relatively slightly nitrogenous adjunct e.g. a preparation of sugars.

In all cases it is envisaged that the advantages which are secured will be related to the possibility of reducing the quantity of enzymes required, in particular of reducing the quantity of brewer's malt where this malt is the, or the major, source of enzymes, or of reducing the amount of added proteolytic enzymes where these are the agency by which part or all of the soluble nitrogenous substances are produced.

Specific examples of the preparation of grists and worts will now be given.

EXAMPLES 1–6

A mixture of ground brewer's malt (37.5g) and wheat flour (12.5g) was mashed with water at 150°F. for 1 hour. The mixture was cooled and diluted to a total volume of 5.5 ml. The wort produced contained 37.2g. of dissolved solids (called the extract) The permanently soluble nitrogen content of the wort (corrected to a wort gravity of 1,040° at 20°C.) was 0.61g./litre. The α-amino-nitrogen content, on the same basis, was 0.11 g./litre.

When another portion of the same brewer's malt (27.5g), special malt (2.5g) (see below) and another portion of the same wheat flour (20g.) were mashed together in the same way the wort contained 37.4g. of dissolved solids, the permanently soluble nitrogen content of the wort (corrected to a wort gravity of 1,040° at 20°C.) was 0.61g./litre and the α-amino nitrogen content on the same basis was 0.11 g./litre.

Similar trials gave the following results:

| Example | Brewer's Malt(g) | Special Malt(g) | Adjunct* (g) | Extract (g) | P.S.N. (g/l at 1040°) | α-amino N (g/l. at 1040°) |
|---------|------------------|-----------------|--------------|-------------|------------------------|---------------------------|
| No. 2   | 37.5             | —               | w.f. 12.5    | 37.2        | 0.61                   | 0.11                      |
|         | 20               | 5               | w.f. 25      | 38.0        | 0.61                   | 0.12                      |
| No. 3   | 30               | —               | f.m. 20      | 37.0        | 0.43                   | 0.09                      |
|         | 20               | 5               | f.m. 25      | 37.0        | 0.43                   | 0.12                      |
| No. 4   | 37.5             | —               | f.b. 12.5    | 34.7        | 0.59                   | 0.13                      |
|         | 20               | 10              | f.b. 20      | 33.4        | 0.56                   | 0.15                      |
| No. 5   | 42.5             | —               | b.m. 7.5     | 35.7        | 0.66                   | 0.13                      |
|         | 27.5             | 2.5             | b.m. 20      | 33.7        | 0.66                   | 0.13                      |
| No. 6   | 42.5             | —               | b.m. 7.5     | 35.7        | 0.66                   | 0.13                      |
|         | 25               | 5               | b.m. 20      | 33.6        | 0.67                   | 0.15                      |

* w.f.=wheat flour; f.m.=flaked maize; f.b.=flaked barley; b.m.=barley meal.

In these examples the special malt which was used had the following analysis: P.S.N. (percent dry basis), 0.991: α-amino N (percent dry basis), 0.392: acidity (percent dry basis, expressed as lactic acid), 2.69.

EXAMPLES 7 AND 8

The various components of the grists specified below were finely ground and extracted with water under the following conditions: a total of 50 g. of ground material was digested for one-half hour with 200 ml of distilled water at 45°C. The special malt had a P.S.N. content which was 642 percent of its total nitrogen, and an α-amino nitrogen content of 23.5 percent of its total nitrogen. The temperature of the mixture was then raised at the rate of 1°C per minute to 70°C, when a further 100 ml of water at 70°C was added. Digestion continued for 1 hour at the latter temperature. The mixture was cooled to 20°C, made up to a weight of 450 g. and filtered. The filtrate (wort) was subsequently analysed to determine the total quantity of material extracted (as a percentage of the dry weight of the original grist) and the total soluble nitrogen solubilized (also as a percentage of the dry weight of the original grist). The results obtained in the presence of 30 and 50 percent of adjunct, together with results obtained in the absence of the special malt and for the special malt alone were as follows:

| Example No. | Barley Meal % | Ordinary Malt % | Special Malt % | Extract % | Total soluble nitrogen % of dry basis | α-amino nitrogen % of dry basis |
|---|---|---|---|---|---|---|
| 7 | 30 | 70 | 0 | 78.7 | 0.579 | 0.124 |
|  | 50 | 45 | 5 | 78.5 | 0.566 | 0.125 |
|  | 50 | 40 | 10 | 78.5 | 0.601 | 0.131 |
|  | 0 | 0 | 100 | 83.9 | 1.086 | 0.398 |

| | Rice grits % | Ordinary Malt % | Special Malt % | Extract % | Total soluble nitrogen % | α-amino nitrogen % on dry basis |
|---|---|---|---|---|---|---|
| 8 | 30 | 70 | 0 | 83.1 | 0.476 | 0.118 |
|  | 50 | 45 | 5 | 82.9 | 0.419 | 0.105 |
|  | 50 | 40 | 10 | 83.6 | 0.499 | 0.114 |

EXAMPLE 9

This Example shows a preparation of wort from a grist comprising barley meal (75 percent) and the special malt (25 percent) used in Examples 7 and 8, in the presence of α-amylase. The starchdegrading enzyme α-amylase is added as an exogenous preparation because the grist in spite of the presence of the special malt would not otherwise have a sufficient amount of enzymes with such action, and the starch of the grist would be insufficiently converted without it. The addition of such starch-degrading enzymes to a grist in these circumstances is included generally within the present invention. Specifically, the components of the grist were finely ground and extracted with water as follows: 50 g. total weight was digested for 1 hour at 60°C with 110 ml water containing α-amylase (0.1 percent by weight of total grist weight). After this period the temperature was raised immediately to 70°C by the addition of a further 110 ml of hot water. Digestion was continued for 1 hour at the latter temperature. The mixture was then cooled to 20°C, made up to a volume of 515 ml at this temperature and filtered. The filtrate was then analysed to determine the quantity of grist solubilized measured as a percentage of the dry weight of original grist and the permanently soluble nitrogen (measured as a percentage of the dry weight of the original grist).

The analytical results were as follows:

| | |
|---|---|
| Extract: | 80.5% |
| Permanently Soluble Nitrogen: | 0.584% |
| α-amino nitrogen: | 0.169% |

EXAMPLES 10 to 13

The use of glucose syrup to restore nitrogen balance in a wort. An ordinary malt was extracted alone by the method described in Example 9. It gave the following analysis: Extract 80 percent; Permanently Soluble Nitrogen 0.628 percent. 15 percent of the ordinary malt was then replaced by various special malts designated A to D and then, to restore the nitrogen balance of the final extract to the level obtained in the presence of the ordinary malt alone, various amounts of a non-nitrogenous glucose syrup were added to the wort. The total quantities of malt used to obtain a given amount of extract in the presence of various special malts (of different soluble nitrogen contents) was reduced as is shown below, the reduction being expressed as the proportion of dissolved solids in the wort contributed by the syrup.

| Example No. | Special malt | α-amino nitrogen content (% of dry malt) | Permanently Soluble nitrogen of special Malt (% of dry malt) | (% of total malt nitrogen) | Proportion of dissolved solids due to the syrup % |
|---|---|---|---|---|---|
| 10 | A | 24.3 | 1.308 | 68.8 | 32.1 |
| 11 | B | 32.7 | 1.413 | 74.4 | 38.1 |
| 12 | C | 24.5 | 1.485 | 64.6 | 37.8 |
| 13 | D | 29.2 | 1.592 | 69.2 | 41.1 |

An equivalent result is obtained whether the syrup is added to the grist, to the wort or partially to both.

In general balance of a wort by a syrup will be possible when there is more than 2 percent of a special malt and more than 20 percent of brewer's malt in the grist.

Examples 14 to 25 are examples of analyses of special malts:

| | Extract (%) | α-amino nitrogen content % of total malt nitrogen | Permanently soluble nitrogen | |
|---|---|---|---|---|
| | | | (% of dry malt) | (% of total malt nitrogen) |
| 16 | 79.2 | 23.8 | 0.948 | 55.8 |
| 17 | 85.6 | 27.2 | 1.028 | 60.5 |
| 18 | 86.6 | 28.6 | 1.081 | 63.4 |
| 19 | 85.1 | 25.4 | 1.134 | 59.7 |
| 20 | 85.3 | 27.8 | 1.154 | 64.0 |
| 21 | 82.8 | 26.4 | 1.283 | 67.5 |
| 22 | 85.4 | 24.3 | 1.308 | 68.8 |
| 23 | 81.8 | — | 1.362 | 64.9 |
| 24 | 85.9 | 32.7 | 1.413 | 74.4 |
| 25 | 85.9 | 24.5 | 1.485 | 64.6 |
| 26 | 86.8 | 29.2 | 1.592 | 69.2 |
| 27 | 83.7 | 24.8 | 1.814 | 64.8 |

The invention comprehends the use of special malts of different analyses, provided they have a level of P.S.N. which is at least 50 percent of the total nitrogen content of the special malt, and usually will be not greater than 90 percent, an α-amino nitrogen content of at least 16 percent of the total nitrogen of the malt, and usually which will not exceed 35 percent. The acidity of these malts calculated as lactic acid may be higher than for an ordinary malt, usually being above 1.2 percent, but need not be that high, and the use of these special malts in any significant quantities, 0.35 percent by weight being a practical minimum. They may be used as extracts or concentrates.

As has been shown, balance in a resultant wort may be assured, if the presence or quantity of the special malt causes an excessively high P.S.N./carbohydrate ratio in the wort, by adding a syrup to the grist or to the wort, the syrup being for example prepared from maize starch.

I claim:

1. In a process of making a brewer's wort for making beer and in which adjunct is used in addition to brewer's malt, the improvement wherein the amount of adjunct used is in an amount of at least 50 percent by weight, solids basis, by employing in the grist, in addition to brewer's malt, from 2 to 20 percent by weight of a special malt, said special malt having essentially at least 50 percent of its total nitrogen in the form of permanently soluble nitrogen, and at least 16 percent of its total nitrogen in the form of $\alpha$-amino nitrogen, said wort having a permanently soluble nitrogen content of from 0.43 to 0.67 grams per liter calculated in the basis of a specific gravity of 1.04 and having an $\alpha$-amino nitrogen content of from 0.105 to 0.15 grams per liter calculated on the basis of a specific gravity of 1.04.

2. The improvement as claimed in claim 1 wherein at least part of the adjunct is added to a wort produced from mashing a grist containing the said special malt.

3. A process of making a brewer's wort comprising providing a grist comprising brewer's malt, from 2 to 20 percent by weight of a special malt having essentially at least 50 percent of its total nitrogen in the form of permanently soluble nitrogen, and at least 16 percent of its total nitrogen in the form of $\alpha$-amino nitrogen, and adjunct in an amount of at least 50 percent by weight solids basis, and mashing the grist to form a wort having a permanently soluble nitrogen content of from 0.43 to 0.67 grams per liter calculated on the basis of a specific gravity of 1.04 and having an $\alpha$-amino nitrogen content of from 0.105 to 0.15 grams per liter calculated on the basis of a specific gravity of 1.04.

4. A process as claimed in claim 3 wherein the said special malt has an acidity of at least 1.2 percent calculated as lactic acid.

5. A brewer's grist for making wort, said grist comprising brewer's malt, adjunct, and special malt, said special malt having essentially at least 50 percent of its total nitrogen in the form of permanently soluble nitrogen and at least 16 percent of its total nitrogen in the form of $\alpha$-amino nitrogen, said special malt being present in the grist in an amount of from 2 to 20 percent by weight, said adjunct being present in said grist in an amount of at least 50 percent based on the total weight of malt and adjunct, solids basis, the balance of the malt in the grist being brewer's malt, said grist being capable, when mashed, of making wort having a permanently soluble nitrogen content of from 0.419 to 0.67 grams per liter calculated in the basis of a specific gravity of 1.04 and having an $\alpha$-amino nitrogen content of from 0.105 to 0.15 grams per liter calculated in the basis of a specific gravity of 1.04.

6. A brewer's grist according to claim 5 wherein said special malt has an acidity of at least 1.2 percent calculated as lactic acid.

* * * * *